US010785362B2

(12) United States Patent
Cheung et al.

(10) Patent No.: US 10,785,362 B2
(45) Date of Patent: *Sep. 22, 2020

(54) ENHANCED VIDEO SHARING

(71) Applicant: AT&T INTELLECTUAL PROPERTY I, L.P., Atlanta, GA (US)

(72) Inventors: Eric Sau Hoi Cheung, New York, NY (US); Gerald Michael Karam, Morristown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,882

(22) Filed: Jan. 11, 2019

(65) Prior Publication Data
US 2019/0149646 A1    May 16, 2019

Related U.S. Application Data

(63) Continuation of application No. 12/882,171, filed on Sep. 14, 2010, now Pat. No. 10,187,509.

(51) Int. Cl.
*H04M 1/725* (2006.01)
*H04N 21/4788* (2011.01)
*H04N 21/414* (2011.01)

(52) U.S. Cl.
CPC ...... *H04M 1/7253* (2013.01); *H04N 21/4788* (2013.01); *H04M 1/72572* (2013.01); *H04M 2250/04* (2013.01); *H04M 2250/10* (2013.01); *H04N 21/41407* (2013.01)

(58) Field of Classification Search
CPC ........... H04M 1/7253; H04M 1/72572; H04M 2250/04; H04M 2250/10; H04N 21/4788; H04N 21/41407
See application file for complete search history.

(56) References Cited

U.S. PATENT DOCUMENTS

| 6,370,137 B1 | 4/2002 | Lund |
| 6,778,973 B2 * | 8/2004 | Harlan ................. G06Q 10/025 701/400 |
| 7,046,269 B2 | 5/2006 | Parker et al. |

(Continued)

FOREIGN PATENT DOCUMENTS

WO    2008009838 A2    1/2008

*Primary Examiner* — Nathan J Flynn
*Assistant Examiner* — Tung T Trinh
(74) *Attorney, Agent, or Firm* — Guntin & Gust, PLC; Jay Anderson

(57) ABSTRACT

A method includes receiving, at a first device, an option to receive a video identified by a second device, the option received during a communication session between the first device and the second device. The method includes receiving, at the first device, input indicating acceptance of the offer. The method includes, in response to the input, automatically making a determination, at the first device, whether to have the video sent to a video output device that is distinct from the first device, to receive the video at the first device, or both. The determination is based on a location of the first device. The method also includes, in response to the determination indicating to have the video sent to the video output device, sending a notification to the application server. The notification identifies the video output device.

20 Claims, 6 Drawing Sheets

(56) References Cited

U.S. PATENT DOCUMENTS

| | | | | |
|---|---|---|---|---|
| 7,277,858 B1* | 10/2007 | Weaver | G09B 21/009 | 379/52 |
| 8,180,853 B2* | 5/2012 | Lee | H04L 67/104 | 709/204 |
| 8,239,898 B2* | 8/2012 | Rahman | H04N 7/17318 | 725/87 |
| 8,549,156 B1* | 10/2013 | Croak | H04L 12/1822 | 709/219 |
| 8,666,538 B2* | 3/2014 | Deas | G06Q 30/02 | 700/231 |
| 8,958,828 B2* | 2/2015 | Zheng | H04M 1/72569 | 455/456.4 |
| 10,187,509 B2* | 1/2019 | Cheung | H04M 1/7253 | |
| 2004/0246951 A1* | 12/2004 | Parker | H04L 29/1216 | 370/356 |
| 2006/0095402 A1* | 5/2006 | Lee | H04N 21/43632 | |
| 2006/0193448 A1 | 8/2006 | Donoghue et al. | | |
| 2006/0221917 A1 | 10/2006 | McRae | | |
| 2006/0271687 A1* | 11/2006 | Alston | H04N 7/147 | 709/227 |
| 2007/0136488 A1 | 6/2007 | Cho et al. | | |
| 2007/0254647 A1 | 11/2007 | Salkintzis | | |
| 2007/0296805 A1* | 12/2007 | Tedenvall | H04L 65/4092 | 348/14.01 |
| 2008/0146204 A1 | 6/2008 | Gu et al. | | |
| 2008/0186196 A1* | 8/2008 | Lessing | G06Q 10/109 | 340/686.6 |
| 2008/0192736 A1* | 8/2008 | Jabri | G11B 27/034 | 370/352 |
| 2008/0194298 A1* | 8/2008 | Panabaker | G06F 9/451 | 455/566 |
| 2009/0070840 A1* | 3/2009 | Kamimaki | H04N 21/43615 | 725/114 |
| 2009/0197524 A1 | 8/2009 | Haff et al. | | |
| 2009/0215477 A1* | 8/2009 | Lee | H04L 51/38 | 455/466 |
| 2009/0303964 A1* | 12/2009 | Lamer | H04L 65/1069 | 370/331 |
| 2010/0080163 A1* | 4/2010 | Krishnamoorthi | H04N 21/2385 | 370/312 |
| 2010/0082567 A1* | 4/2010 | Rosenblatt | G06F 16/40 | 707/705 |
| 2010/0100822 A1* | 4/2010 | Aaron | H04L 12/66 | 715/730 |
| 2010/0135200 A1* | 6/2010 | Karaoguz | H04L 67/16 | 370/328 |
| 2010/0153577 A1 | 6/2010 | Wohlert et al. | | |
| 2011/0016492 A1* | 1/2011 | Morita | H04N 21/42201 | 725/58 |
| 2011/0037712 A1* | 2/2011 | Kim | H04M 1/72583 | 345/173 |
| 2011/0075612 A1* | 3/2011 | Guo | H04L 67/26 | 370/329 |
| 2011/0191816 A1* | 8/2011 | Henry | H04L 65/604 | 725/153 |
| 2011/0320495 A1* | 12/2011 | Levy-Yurista | G01S 5/02 | 707/780 |
| 2014/0032636 A1* | 1/2014 | Nelson | H04N 21/43615 | 709/203 |

* cited by examiner

ENHANCED VIDEO SHARING

PRIORITY CLAIM

This application claims priority from, and is a continuation of, U.S. patent application Ser. No. 12/882,171, filed on Sep. 14, 2010, which is incorporated herein by reference in its entirety.

FIELD OF THE DISCLOSURE

The present disclosure relates to video sharing. In particular, the present disclosure relates to video sharing between mobile and/or landline devices for live and pre-recorded video content.

BACKGROUND

Mobile devices, such as cellular telephones, are more and more ubiquitous in today's world. More powerful mobile devices with advanced features, such as smartphones having voice and data capabilities, enable various types of communication services beyond the traditional voice calls. Mobile devices are now an important tool for both business and personal uses.

In many instances, a user desires to share video content with another user. While video sharing exists, the current systems and methods contain many limitations. For instance, video sharing may require supported phones on special networks or may require first uploading the video to a website. Sharing video, for example, on social networking sites requires many steps. For instance, the user must upload a video to the site, copy a link to the video, and send the link to the other party before the other party can even start watching the video. With slow upload speeds this may become very time consuming for the user. Additionally, when uploading to a social networking site, there is very little control over the video. For instance, the user cannot always control who can watch the video and when. The video is often available for a long period of time and to a large group of people. The user is not often aware of who viewed the video and when.

What is therefore needed is a device, system, or method to easily share video in real-time during a multimedia call (e.g. voice, audio, text-based instant messaging, etc.).

SUMMARY

The present disclosure solves the above problems by sharing video between devices during a voice call. In exemplary embodiments, a sending party and a receiving party can view a video during the voice call, enabling a live discussion of the video. During a connected voice call between a first mobile device and a second mobile device, the first mobile device signals to an application server the desire to share a video with the second mobile device. The application server determines the settings and preferences of each device as well as a location of the video. The application server appropriately instructs a media server to obtain the video and transcode the video for delivery to the second mobile device, the first mobile device, and/or an external display device. The external display device is a device at the same location as the second mobile device which may receive the video instead of or in addition to the second mobile device. The media server communicates with the first mobile device, the second mobile device, and/or the external display device over a network to obtain and deliver the video. The video may be streamed to the media server from the first mobile device or the media server may otherwise locate the video from within the network. The media server streams the video to the second mobile device, the first mobile device, and/or the external display device.

The present disclosure provides a better user experience to both the sending party and the receiving party than current methods of video sharing. For example, the number of steps of operation required by each of the parties is drastically reduced. Further, each party can use a mobile device or external display device based on the current location of the party's mobile device, the current activity, the time of day, etc. Sharing a video during a voice call also provides a stronger notion of who can view the video and at what time.

In one exemplary embodiment, a mobile device for receiving a shared video for a recipient having multiple video output devices includes a processor, a memory in communication with the processor, a display in communication with the processor, an input in communication with the processor, a transceiver in communication with the processor, and a video logic on the memory. The video logic is configured to receive a request to share a video with the recipient, determine that the video should be sent to a video output device, and send a request to send the video to the video output device. The mobile device is connected in a voice call and the video is streamed to the video output device.

In another exemplary embodiment, a system for relaying a shared video across a network to a recipient having multiple video output devices includes a network, a first mobile device in communication with the network, a second mobile device in communication with the network, a video output device in communication with the network, an application server in communication with the network, and a media server in communication with the network. The application server includes configuration logic to receive a request from the first mobile device to share a video, determine that the video should be sent to the video output device, and instruct the media server to stream the video to the video output device.

In another exemplary embodiment, a method for relaying a shared video across a network to a recipient having a plurality of video output devices includes receiving a request from a first mobile device to share a video with a second mobile device connected in a voice call with the first mobile device. The first mobile device and the second mobile device are connected to the network. The method includes determining that the video should be sent to a video output device, where the video output device is connected to the network. The method also includes streaming the video to the video output device.

DETAILED DESCRIPTION

Figure 1:
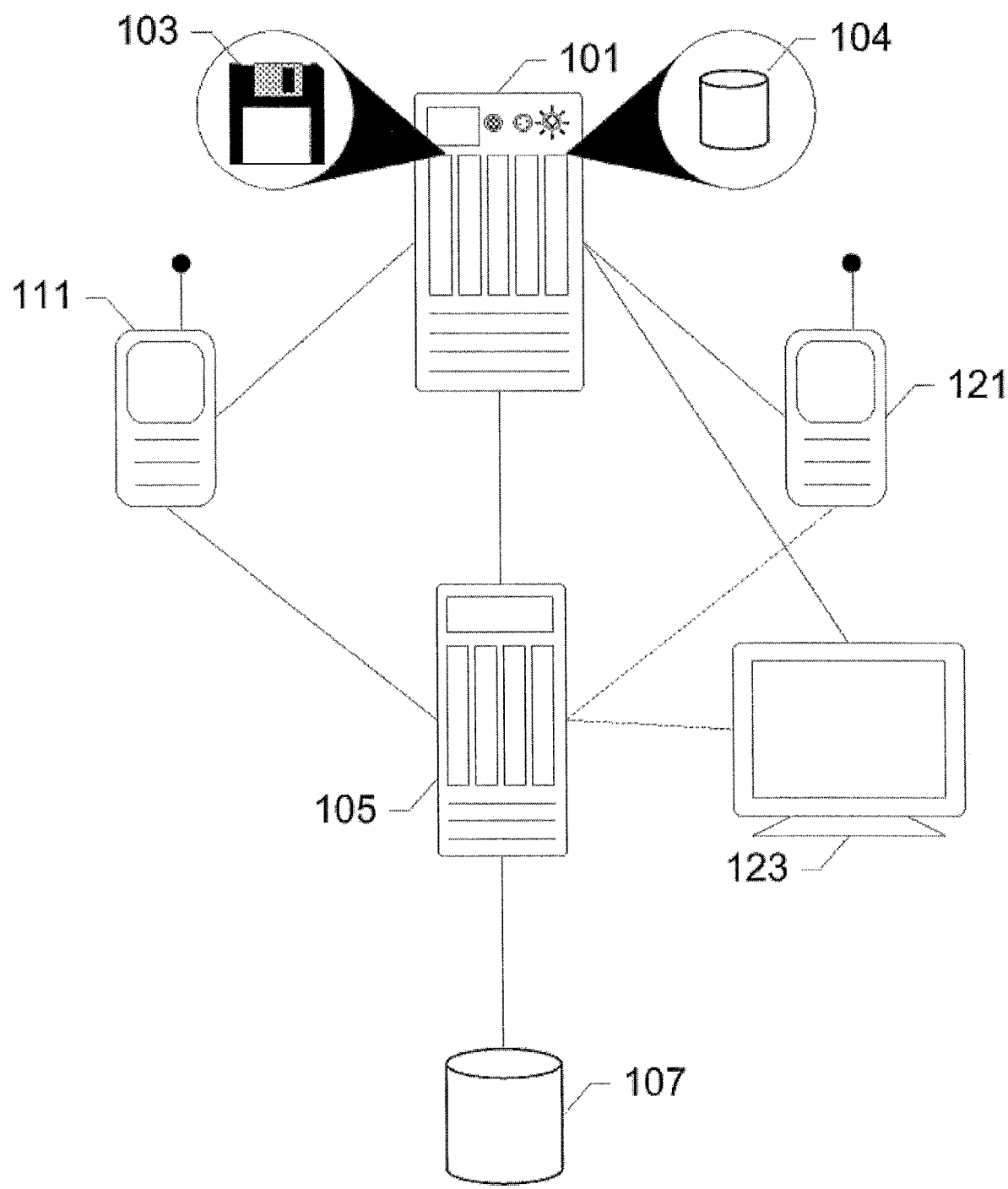
FIG. 1 is a block diagram of an embodiment of a system for enhanced video sharing during a voice connection.

The present disclosure presents devices, systems, and methods for sharing video between devices during a voice call. In exemplary embodiments, a sending party and a receiving party can view a video during the voice call, enabling a live discussion of the video. During a connected voice call between a first mobile device and a second mobile device, the first mobile device signals to an application server the desire to share a video with the second mobile device. The application server determines the settings and preferences of each device as well as a location of the video. The application server appropriately instructs a media server to obtain the video and transcode the video for delivery to the second mobile device, the first mobile device, and/or an external display device. The external display device is a device at the same location as the second mobile device. The external display may receive the video instead of or in addition to the second mobile device. The media server communicates with the first mobile device, the second mobile device, and/or the external display device over a network to obtain and deliver the video. The video may be streamed to the media server from the first mobile device or the media server may otherwise locate the video from within the network. The media server streams the video to the second mobile device, the first mobile device, and/or the external display device.

Use of the present disclosure enables a better user experience to both the sending party and the receiving party than current methods of video sharing. For example, the number of steps of operation required by each of the parties is drastically reduced. Further, each party can use a mobile device or external display device based on the current location of the party's mobile device, the current activity, the time of day, etc. Sharing a video during a voice call also provides a stronger notion of who can view the video and at what time.

"Mobile device", as used herein and throughout this disclosure, refers to any electronic device capable of wirelessly sending and receiving data. A mobile device may have a processor, a memory, a transceiver, an input, and an output. Examples of mobile devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH®. Communication across a network is preferably packet-based; however, radio and frequency/amplitude modulations networks can enable communication between mobile devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information. A server may communicate with other servers on different networks to update a user account.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows an embodiment of a system for enhanced video sharing during a voice connection. In this embodiment, the system includes a first mobile device 111, a second mobile device 121, an external display device 123, and a cellular network including an application server 101 and a media server 105.

First mobile device 111 includes at least one transceiver to communicate with the cellular network. First mobile device 111 is capable of both voice and data connections over the cellular network. First mobile device 111 may also include a camera for capturing a video.

The cellular network provides a radio network for communication between devices, including first mobile device 111 and second mobile device 121. Wireless carriers typically provide service to a geographic market area by dividing the area into many smaller areas or cells. Each cell is serviced by a radio transceiver, such as base transceiver stations. Base transceiver stations connect first mobile device 111 and second mobile device 121 to other elements of the cellular network. For instance, base transceiver stations connect first mobile device 111 and second mobile device 121 to Mobile Switching Centers (MSCs) through landlines or other communication links, and the MSCs may, in turn, be connected via landlines to the Public Switched Telephone Network (PSTN), to other cellular networks, to IP networks, etc. First mobile device 111 and second mobile device 121 communicate with application server 101 and media server 105 using these components of the cellular network.

Application server 101 is a server located on the cellular network. Application server 101 provides a signaling platform for delivering video during a connected voice session. Application server 101 is in communication via the cellular network with first mobile device 111 and second mobile device 121 and may further be in communication with external display device 123 via the cellular network or via any wired or wireless network. Connections between application server 101 and first mobile device 111, second mobile device 121, and optionally external display device 123 allow application server 101 to set up and maintain connections between media server 105 and first mobile device 111, second mobile device 121, and external display device 123. These connections also allow application server 101 to update these devices, determine the capability of the devices, etc.

Application server includes a configuration logic 103 and a configuration database 104. Configuration logic 103 provides signaling to each of first mobile device 111, second mobile device 121, and media server 105 to appropriately connect each for delivering video. Configuration logic 103 includes instructions for signaling and connecting each of the mobile devices 111 and 121 and external display device 123 with media server 105 as well as messages and/or other data sent with the signaling. Configuration logic 103 includes instructions for determining preferences and settings from configuration database 104 for each of the mobile devices 111 and 121. Configuration logic 104 also determines the capabilities of each of the mobile devices 111 and 121 and external display device 123 as well as strengths of the signals between the mobile devices and the cellular network and/or other wireless networks. Signal strengths may be used to adjust streaming rates for each mobile device. Configuration logic 103 may further include instructions for the compression/decompression of video files for videos sent and received by media server 105. Configuration logic 103 references configuration database 104 to ensure media is delivered in a proper configuration to second mobile device 121 and/or first mobile device 111. Configuration database 104 contains device capabilities of first mobile device 111 and second mobile device 121, user profiles, etc. The user profiles may contain preferences, settings, etc. for users of the system. These user profiles may be programmed by the users through their respective mobile device, may be programmed using a personal computer, may be learned by application server 101 based upon previous sessions, etc.

When first mobile device 111 desires to share a video with second mobile device 121, first mobile device 111 uses an application onboard first mobile device 111 to select the video. First mobile device 111 signals to application server 101 that the video is to be sent to second mobile device 121. If the video is from onboard first mobile device 111, application server 101 instructs media server 105 to connect with first mobile device 111 and the video is streamed or otherwise delivered to media server 105. Application server 101 searches configuration database 104 for a proper configuration for second mobile device 121 and/or external display device 123. Application server 101 signals the appropriate instructions to media server 105. These instructions include where to send the video, as well as the configuration necessary for second mobile device 121 and/or external display device 123. If the video is not onboard first mobile device 111 but rather at a remote location, such as media database 107, the instructions further include the location of the video. Media server 105 then connects to the specified location to retrieve the video.

Media server 105 is a server located on the cellular network. Media server 105 includes logic to establish a connection between media server 105 and first mobile device 111, second mobile device 121, and/or external display device 123 via a cellular data connection across cellular network. Media server 105 may further connect to external display device 123 via a wired or wireless network. For instance, media server 105 may connect to external display device 123 via fiber optic cable. Media server 105 also contains logic to transcode the video selected by first mobile device 111 based upon instructions from application server 101. The transcoding ensures that the video is in a proper format for the device receiving the video.

Media server 105 contains or is in communication with a media database 107. Media database 107 stores videos that may later be transmitted to devices. Media database 107 may also store a copy of a video streamed or uploaded by first mobile device 111 and/or second mobile device 121 for later use. Thus, later requests for the video do not require first mobile device 111 to upload or stream the video again. Media server 105 may receive the video from first wireless device 111, second wireless device 121, may locate the video from media database 107, or may retrieve video through a network connection. Media server 105 transcodes the video into the appropriate format for second mobile device 121, first mobile device 111, and or external display device 123. Transcoding may include formatting the video for a screen size, a file type, a file size, etc. Media server 105 sends the formatted video through the cellular network to, for instance, second mobile device 121. Media server 105 may further introduce a buffer when sending the video. When being viewed by multiple parties, this may ensure that each party is watching the same portion of the video at the same time. Thus, in embodiments of the disclosure, the video is synchronized as much as possible. Further, in particular embodiments, the sending party, or each of the parties, is able to control the video during playback. The parties may pause the video, jump to another point, play the video in slow motion, etc.

In particular embodiments, the functions of application server 101 and media server 105 are combined into one server on the cellular network. In other embodiments, all videos are sent through application server 101. Thus, for instance, video is uploaded from first mobile device 111 to media server 105 through application server 101 rather than directly and video is transmitted from media server 105 to second mobile device 121 through application server 101.

Second mobile device 121 includes a display as well as logic to receive and play back video. When second mobile device 121 receives the video from media server 105, second mobile device 121 may display the video. Second mobile device 121 also includes, or is in communication with an audio output such as a speaker to play the audio associated with the video.

Second mobile device 121 may further include a GPS receiver or other means of determining a location of second mobile device 121. Second mobile device 121 may use this location to determine aspects of the playback of the video. For instance, the user may program that when second mobile device 121 is in a certain location, videos should be sent to external display device 123 rather than or in addition to second mobile device 121.

Second mobile device 121 may further include a near field communication (NFC) transceiver. This may utilize BLU-ETOOTH®, WiFi, RFID, etc. NFC transceiver allows second mobile device 121 to communicate with nearby devices, such as external display device 123. When second mobile device 121 senses external display device 123 through the NFC transceiver, second mobile device 121 signals to application server 101 to have videos sent directly to external display device 123. Application server 101 signals media server 105 to give media server 105 instructions regarding the new location for sending the video as well as the necessary configuration for external display device 123.

Embodiments of the system include external display device 123. External display device 123 may be used in instances where second mobile device 121 does not have a sufficient display. Alternatively, external display device 123 may simply provide a higher quality or different display. For instance, a large projection system may provide a better display than second mobile device 121 when displaying a video to a large audience. External display device 123 may be a television with a set-top box such as an IPTV box, a monitor of a home computer, a projector, or equivalent means of receiving a video signal and displaying a corresponding video. External display device 123 is in communication with application server 101 and media sever 105 via the cellular network and/or another wireless or wireline network. The video may be sent directly from media server 105 to external display device 123 according to the preferences and settings of second mobile device 121. For instance, when second wireless device 121 is located at a user's home, the user would rather view the video on his television. The location of second mobile device 121 or second mobile device 121's proximity to external display device 123 is detected. This detection is signaled to application server 101 which signals media server 105 to send the video to external display device 123. This detection may occur while the video is being played by second mobile device 121. When in proximity to external display device the user of second mobile device 121 may be notified that the video has started streaming to external display device 123 in addition to or instead of second mobile device 121. This notification may be a verbal notification from media server 105 or application server 101, may be a text notification, etc. Some external display devices may further require the user to log in, such that the video is not shared with an inappropriate party.

The entire process, from streaming or locating a video to displaying the video may occur in real-time so that the users may view the video without unnecessary waiting. To ensure the timeliness of the process, the quality of the videos transmitted may be dynamically adjusted due to the detected bandwidth. For instance, the video quality transmitted may be decreased when a low bandwidth is available and increased when a higher bandwidth is available. The video quality may be adjusted by one or more of first mobile device 111, application server 101, media server 105, second mobile device 121, and external display device 123.

The preferences and settings in the user profile may further include location and time settings. For instance, a receiving user may desire to have video sent to an external display device at certain times or locations. The user may further adjust settings such that, for instance, during business hours, or at the location of the office, any video streamed to the user's mobile device instead be delivered to the user's work computer. Video streamed at other times or locations is delivered to the user's mobile device. These settings can be fixed by the user, or can be dynamically adjusted based on historical adjustments made by one or more users.

For simplicity, FIG. 1 only shows first mobile device 111 selecting a video and second mobile device 121 or external display device 123 displaying the video. However, the process can flow either way, i.e. each mobile device may select video to send to the other user, including video captured by the mobile device. Each mobile device may also display video selected by the opposite mobile device. Further, a second external display device may be used by first mobile device 111, similar to the use of external display device 123 by second mobile device 121.

Such a system may be useful in many situations. For instance, a sender, Alice, is on a telephone call with the receiver, Bob. The application server is invoked in the signaling path. Alice wishes to share a pre-recorded video on her mobile phone and invokes an application on her mobile phone. On the receiving end, Bob has previously configured his preferences: when he is at the office, he wishes to view shared video on his office computer. Bob logs into the service on a web browser. When Alice begins sharing the video, Bob sees the video as it pops up in a new window. Alice also sees the video on her mobile phone. Alice and Bob can continue the phone conversation to discuss the video while watching the video. In the network, a media server performs any necessary transcoding so that the video is suitable for viewing on Bob's computer. The media server can also perform enhancements as in this case Bob's computer can support higher bandwidth and video size than a mobile phone. Furthermore, Alice can instruct the service to store the video content in a video storage in media database. Alice can then share the video with other people later, even if she deletes the video from her mobile phone, or if she is using a different device later.

In another scenario, Bob is on the road and does not have access to a computer. Again, the service deduces based on Bob's preference and his current context (that he is not at the office) that the video content should be sent to Bob's mobile device. In this case, the application server signals an application on Bob's mobile device to begin playing the video content from the media server.

While two mobile devices are shown, any number of mobile devices may be participants in the video sharing, such as when multiple devices are connected in a conference call. The video may similarly be uploaded to or located by the media server and transmitted to each of the participating mobile devices. The video may also be transmitted to third parties, such that these third parties may watch the video without participating in the voice call.

In particular embodiments, when one of the participating mobile devices senses a wireless network other than the cellular network in the mobile device's proximity, the mobile device may switch to the wireless network. Such a switch may provide the mobile device with a higher bandwidth, may alleviate congestion in the cellular network, etc. The alternate wireless network may be a femtocell, a Wi-Fi router connected to a broadband Internet connection, etc.

While the example of sending a video during a voice call is used above, the video may further be sent while devices are connected in another manner. For example, the devices may be connected in a multimedia call. Such a call may utilize voice, audio, etc. Alternatively, the devices may be connected in a text-based instant message and desire to share video. These and other possibilities are within the scope of the disclosure and would be apparent to one of ordinary skill in the art in light of this disclosure.

Further, in particular embodiments utilizing an external display device, the second mobile device may instead be a landline based device. The first mobile device may be connected to the landline based device in a voice call and send the video to the external display device of the user of the landline based device.

Figure 2A:
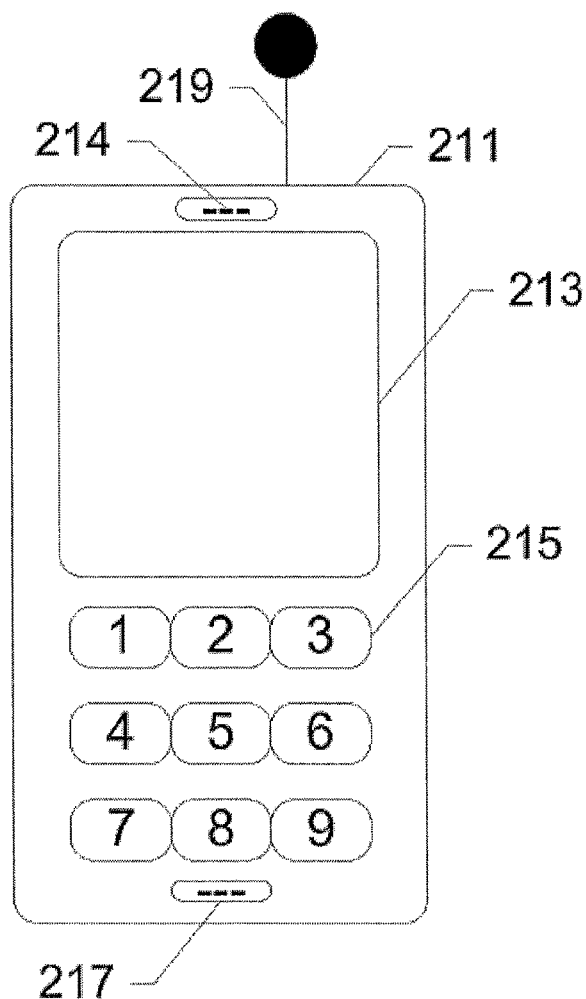
FIG. 2A is a block diagram of external components of an embodiment of a mobile device.
Figure 2B:
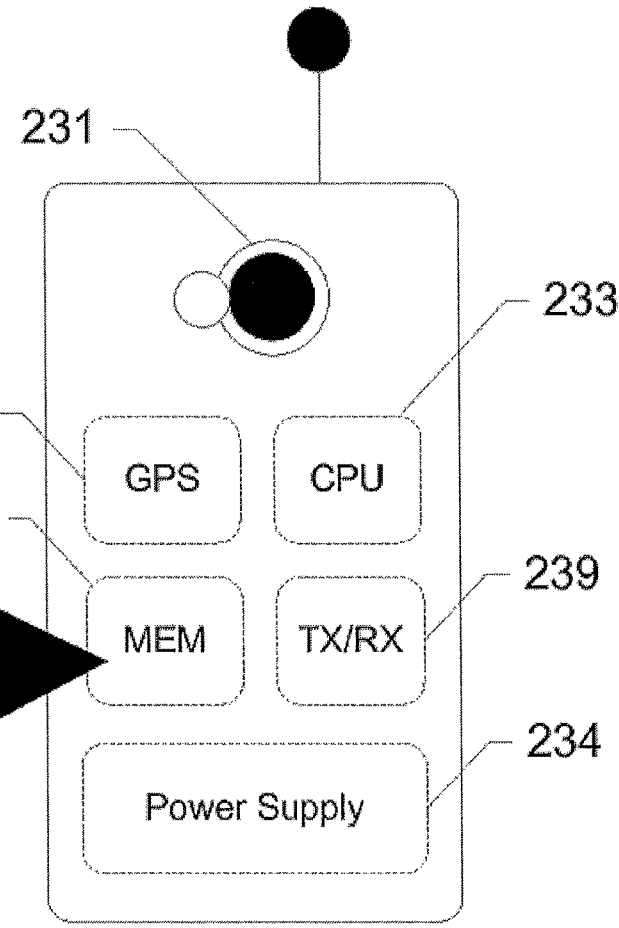
FIG. 2B is a block diagram of an internal components of an embodiment of a mobile device.

FIG. 2A depicts external components of an embodiment of a mobile device 211. FIG. 2B depicts internal components of an embodiment of a mobile device 211. Mobile device 211 includes a speaker 214, a display 213, a microphone 217, an antenna 219, a keypad 215, and a camera 231. Mobile device 211 further includes a transceiver 239, a Global Positioning System (GPS) receiver 235, a power supply 234, a central processing unit (CPU) 233, and a memory 238. Speaker 214 provides an audio output for mobile device 211. Display 213 is an LCD or LED or other type of display on which a user can view selections, numbers, letters, etc. Display 213 allows the user to view video being recorded or video sent to mobile device 211. Display 213 can also be a touchscreen, thereby being used as an input device in lieu of keypad 215.

Keypad 215 acts as an input for mobile device 211, for instance, to type a phone number or a message. Keypad 215 may be a numerical keypad, a QWERTY keyboard, etc.

Microphone 217 allows the user to verbally communicate with others using mobile device 211. Microphone 217 may be used to capture audio along with a recorded video.

Camera 231 may be any optical sensor capable of capturing video. Depending upon the internal components of camera 231, camera 231 may be able to capture varying qualities of video, ranging from QVGA (320 by 240 pixels) to high definition (HD) video.

Antenna 219 is a transducer component designed to transmit or receive electromagnetic waves to and from a network. In conjunction with antenna 219, transceiver 239 allows mobile device 211 to wirelessly communicate with a cellular network or with other mobile devices across the cellular network. Transceiver 239 may be a cellular transceiver, a wireless transceiver, etc., and includes combinations of transceivers to communicate with assorted wireless networks. Transceiver 239 may enable mobile device 211 to wirelessly communicate over short ranges with NFC devices. Transceiver 239 can include, for instance, a BLUETOOTH® transceiver or a contactless integrated circuit card (CICC).

GPS transceiver 235 enables a determination of a location of mobile device 211. Power supply 234 provides power to each of the components of mobile device 211, and can include a battery, as well as an interface to an external power supply.

CPU 233 controls components of mobile device 211 according to instructions in logic stored on memory 237. Memory 237 comprises any computer readable medium, such as RAM, ROM, etc. Memory 237 stores video logic 238, in addition to logic for operating the components of mobile device 211. Video logic 238 contains instructions for selecting video during a connected voice call. Video logic 238 may further contain instructions for compressing recorded video files before transmitting the video files and for decompressing received video files. Video logic 238 may also contain instructions for receiving a request to share a video, determine whether an external display device is nearby, and respond to the request, where the response includes whether to send the video to mobile device 211 or the external display device. Memory 237 may also contain rules related to how a GPS-determined location may be used in conjunction with pre-defined rules to deliver a video according to the preferences of the user. For instance, when a user is located at his or her house, the user may desire to have the video sent to an external display device.

In particular embodiments, the camera 231 may be external to the mobile device. In such instances, the camera 231 may be connected to the mobile device via a wired or a wireless connection. Wired connections can use Universal Serial Bus (USB) or other proprietary interfaces, while wireless connection may be established using WiFi, BLUETOOTH®, WiMAX®, NFC, Infrared, etc. Images, video, and/or sound may be captured by the camera 231 and delivered to the mobile device 211 via the wired or wireless connection. Alternatively, images and video may be captured by the camera 231 while sound is recorded by the mobile device 211.

The mobile device 211 may further include an audio and/or video output port. This port allows the mobile device 211 to connect with an external audio and/or video device via a wired connection. Various possible types of wired connections will be apparent to one of ordinary skill in the art in light of this disclosure.

Figure 3:
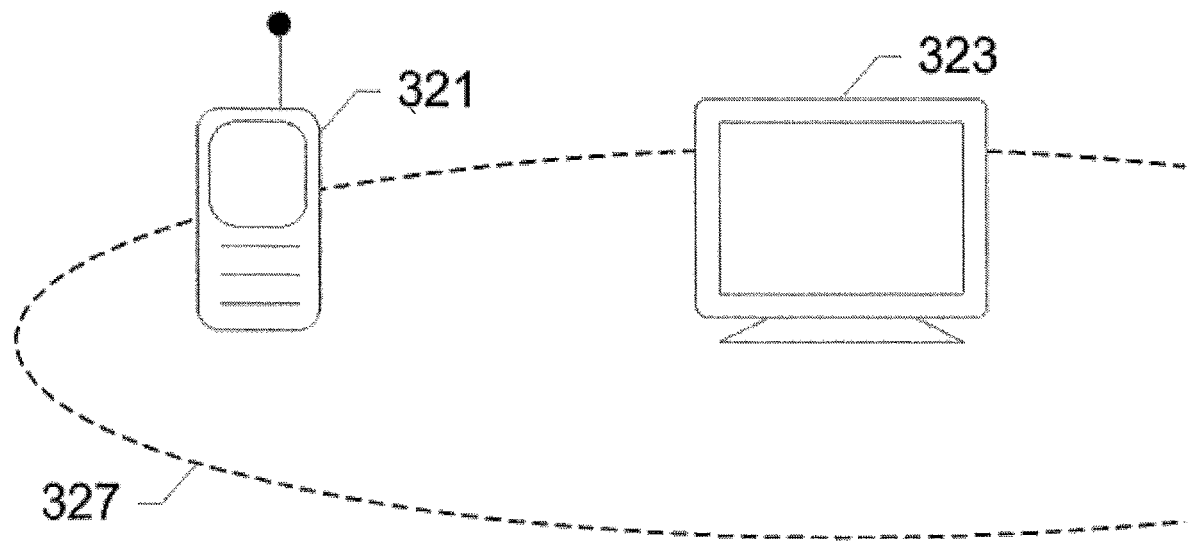
FIG. 3 depicts a block diagram of a mobile device in proximity to an external display device.
Figure 4:
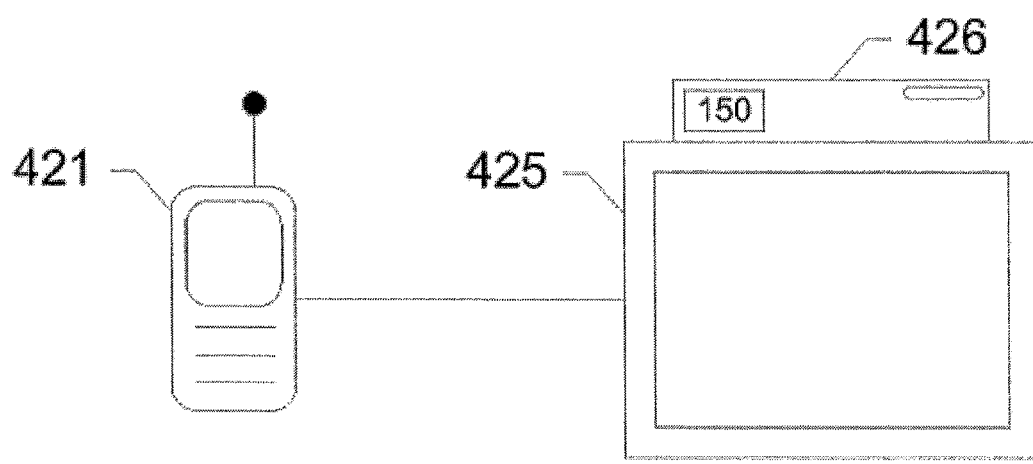
FIG. 4 depicts a mobile device communicating with a television with a set-top box to display a video on the television.

FIG. 3 and FIG. 4 show block diagrams that depict detection and use of an external display device for displaying a video. Existence of a nearby external display devices may be determined based upon a location of the mobile device, a detection of the external display device by the mobile device, etc.

FIG. 3 shows a mobile device 321 in proximity to an external display device 323. In this embodiment, a user of mobile device 321 has set a boundary 327 for using an external display device 323. The boundary is defined by a user-defined radius around the GPS coordinates of external display device 323. When mobile device 321 is within boundary 327, video shared with the user is sent directly to external display device 323, in this case a personal computer. Boundary 327 may be a radius around a certain GPS location, may be detected by the network, such as through triangulation, etc. Coordinates of boundary 327 may be stored on the application server, on mobile device 321, or elsewhere on a network in communication with the application server.

FIG. 4 shows a mobile device 421 communicating with a television 425 with a set-top box 426 to display a video on television 425. Mobile device 421 may receive a video from the media server and send the video to set-top box 426 via a wired connection to display on television 425. The application server may detect or be notified of this connection and instruct the media server to send video in a proper format for television 425 and set-top box 426. In an alternative embodiment, the connection between mobile device 421 and set-top box 426 is wireless, such as through an NFC connection. This may be, for instance, WiFi, BLUETOOTH®, WiMAX®, RFID, etc. In certain embodiments, when mobile device 421 connects with set-top box 426, mobile device 421 transmits the video to set-top box 426. Similar to the wired connection, the application server can detect or be notified of the connection and instructs the media server to appropriately format the video for set-top box 426 and television 425. In other embodiments, mobile device detects the presence of set-top box 426 using NFC communication.

Mobile device 421 then notifies the application server of this presence. The application server then checks the preferences of the user when in proximity of external display devices and appropriately instructs the media server. For instance, the application server may instruct the media server to send the video directly to set-top box 426, may send the video to mobile device 421 formatted for set-top box 426 and television 425, may send the video formatted for mobile device 421, etc.

Figure 5:
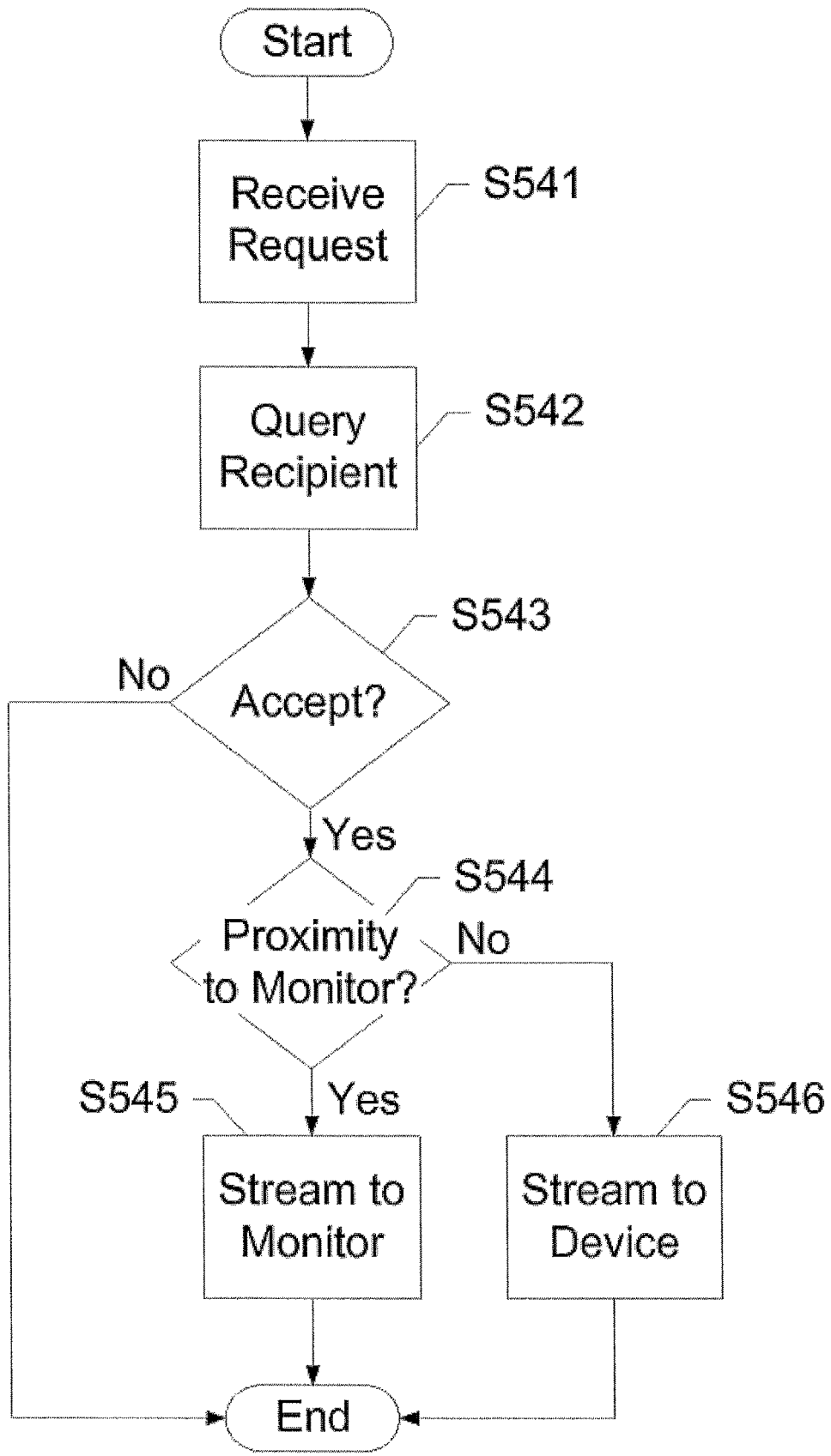
FIG. 5 is a block diagram of a method for sharing a video between mobile devices during a voice call.

FIG. 5 shows an embodiment of a method for sharing a video between mobile devices during a voice call. In this embodiment, the method begins with an application server on a cellular network receives a request S541 from a first mobile device to send a video to a second mobile device while the first mobile device and second mobile device are connected on a voice call. The application server queries the recipient S542, on the second mobile device, whether the recipient wishes to receive the video. The application server then determines whether the recipient has accepted the request S543. This may be determined by receiving a confirmation signal from the second mobile device. If the recipient did not accept the video, the method ends with the first mobile device and the second mobile device still connected in the voice call. If the recipient did accept the video, the application server determines whether the second mobile device is in proximity to a monitor or other external display device S544. This may entail the application server receiving a notification from the second mobile device that the second mobile device is within proximity of the external display device. If the second mobile device is in proximity to the external display device, the application server signals a media server to connect to and stream the video to the external display device S545. If the second mobile device is not in proximity to the external display device, the application server signals the media server to connect to and stream the video to the second mobile device.

In particular embodiments, even if the mobile device does not have any way to display the video, both audio and video are sent if the mobile device settings specify this. This may be useful when the mobile device is recording the streamed video such that the recorded file may be played at a later time on another device or when video output devices are available.

In particular embodiments, the application server may further transfer the connection between either of the parties and the media server to a different data connection, such as WiFi, WiMAX®, etc. when these connections are available. Such connections save resources in the cellular network and may provide the participants with higher bandwidth, allowing for a higher quality of video and audio.

Figure 6:
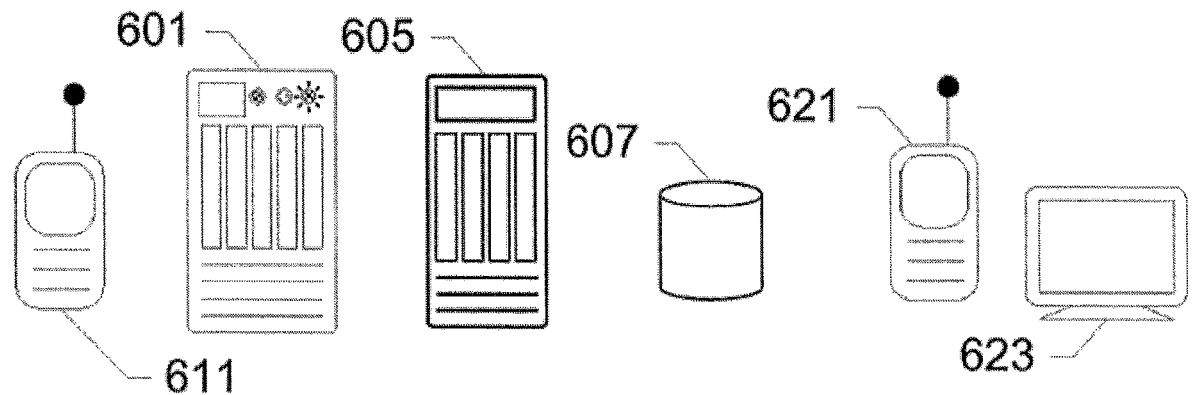
FIG. 6 depicts a flow diagram for video sharing between mobile devices.
Figure 6:
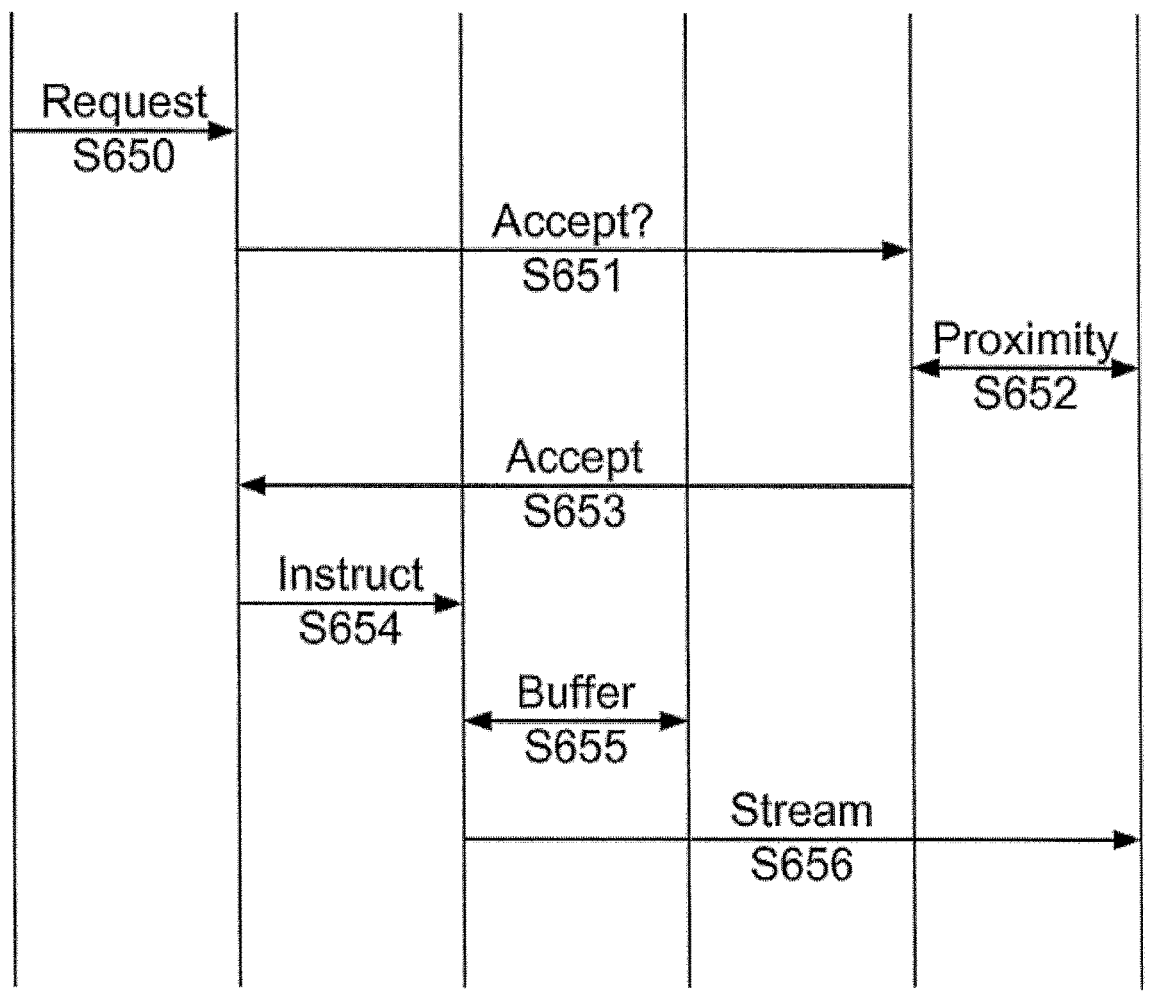

FIG. 6 shows an embodiment of a flow diagram for video sharing between mobile devices. The flow occurs across a network including a first mobile device 611, an application server 601, a media server 605, a media database 607, a second mobile device 621, and an external display device 623. While first mobile device 611 is in a voice call with second mobile device 621, first mobile device 611 sends a request S650 to application server 601. The request is for sending a video to a user of second mobile device 621. The request may be signaled to and received by application server 601 using any form of signaling, such as session initiation protocol (SIP), etc. Application server 601 queries second mobile device 621 to determine if second mobile device 621 accepts the request S651. Second mobile device 621 determines whether second mobile device 621 is in proximity to external display device 623, S652. Second mobile device 621 sends an acceptance of the video transfer S653 to application server 601, the acceptance including a notification of the proximity of second mobile device 621 to external display device 623. Application server 601 instructs S654 media server 605 to locate the video from media database 607, create a connection with external display device 623, and send the video to external display device 623. These instructions include settings, preferences, and capabilities of external display device 623. Capabilities for external display device 623 include the type of display used by external display device 623, signal strengths received by external display device 623, alternate connections possible, such as other wired or wireless networks, etc. Preferences and settings may include a preferred streaming quality. Media server 605 communicates with media database 607 to receive and buffer S655 the video from media database 607. Media server 607 then connects to external display device 623 and streams the video S656 to external display device.

In particular embodiments, the application server begins by signaling the media server to send the video stream to the second mobile device. After the video begins playing on the second mobile device, the second mobile device signals to the application server or the media server that the external display device is in proximity. The application server instructs the media server to transfer the transmission containing the video stream to the external display device or create a second transmission to the external display device in addition to the second mobile device.

Figure 7:
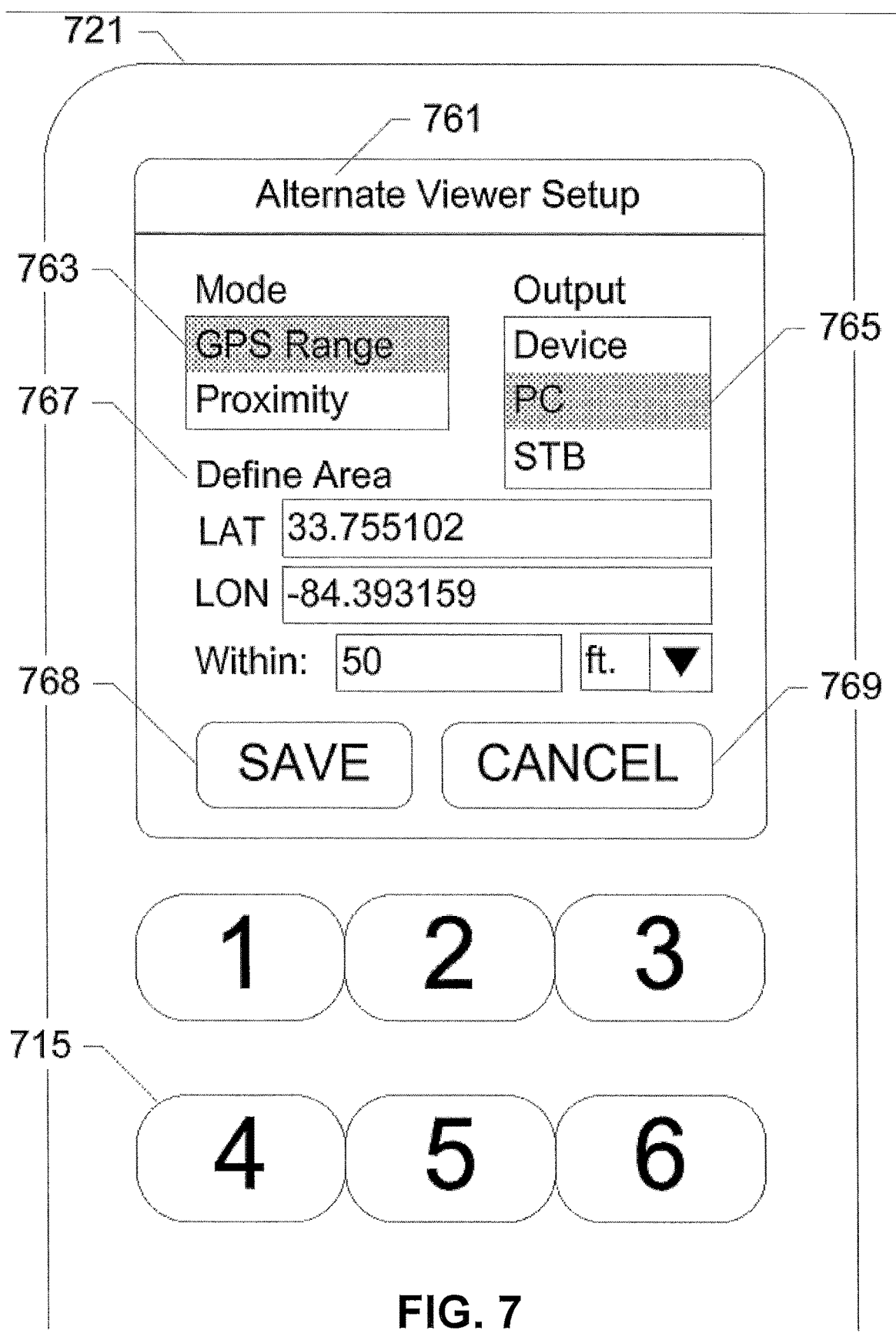
FIG. 7 is a block diagram of an embodiment of a mobile device, where a display shows an interface for programming settings for using an external display device.

FIG. 7 shows an embodiment of a mobile device 721 with an interface for programming settings for using an external display device. In this embodiment, an alternate viewer setup 761 includes a mode 763, an output 765, a defined area 767, a save button 768, and a cancel button 769. A user of mobile device 721 may use a keypad 715 to make selections. Mode 763 allows the user to select a mode of determining when mobile device 721 is near the external display device. When mode 763 is set to GPS range, a GPS location of mobile device 721 determines when the media server will send a video to the external display device. When mode 763 is set to proximity, the media server sends the video to the external display device when mobile device 621 detects a proximity to the external display device. As described above, this may occur through short range NFC communications, etc. Output 765 allows the user to select to which external display device to send the video. For instance, available outputs may be a personal computer, a set-top box, etc. When mode 763 is selected as a GPS range, defined area 767 allows the user to select a latitude and longitude of a location for using the selected external display device. Defined area 767 also allows the user to select a distance around the location, creating an area within which the external display device is used. Save button 768 allows the user to save settings from alternate viewer setup 761. Cancel button 769 cancels changes to alternate viewer setup 761 and reverts to previously saved or default settings.

The foregoing disclosure of the exemplary embodiments of the disclosure has been presented for purposes of illustration and description. It is not intended to be exhaustive or to limit embodiments to the precise forms disclosed. Many variations and modifications of the embodiments described herein will be apparent to one of ordinary skill in the art in light of the above disclosure. For instance, communication between mobile devices and network elements can be accomplished by Internet Protocol (IP) addressing, Session Initiation Protocol (SIP) signaling over an IP Multimedia System (IMS), Voice over IP (VoIP), etc. The scope of the disclosure is to be defined only by the claims appended hereto, and by their equivalents.

Further, in describing representative embodiments of the disclosure, the specification may have presented the method and/or process of the disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the disclosure should not be limited to the performance of their steps in the order written, and one skilled in the art can readily appreciate that the sequences may be varied and still remain within the spirit and scope of the disclosure.

What is claimed is:

1. A method comprising:
    receiving, at a first device from an application server during a communication session between the first device and a second device, an option to receive a video identified by the second device;
    receiving, at the first device, an input indicating an acceptance of the option;
    in response to the input, automatically making a determination, at the first device, whether to have the video sent to a video output device that is distinct from the first device, to receive the video at the first device, or both, wherein the determination is based on a location of the first device, wherein the making the determination comprises communicating via a near-field communication transceiver to nearby devices to determine whether the video output device is close to the location; and
    in response to the determination indicating to have the video sent to the video output device, sending a notification to the application server, wherein the notification identifies the video output device.

2. The method of claim 1, further comprising:
    in response to the determination indicating to send the video to the first device, sending a request for the video to the application server; and
    in response to the sending of the request, receiving the video from a media server.

3. The method of claim 2, further comprising providing data to the application server, wherein the data indicates a format for the video.

4. The method of claim 1, wherein the location is determined by a global positioning system of the first device.

5. The method of claim 1, further comprising, in response to the video output device receiving the video, receiving a particular notice that the video is streaming to the video output device.

6. The method of claim 5, wherein the particular notice is received from the application server or a media server.

7. The method of claim 4, wherein the first device is configured to determine whether the location is within a boundary for use of the video output device.

8. The method of claim 1, wherein the communication session comprises a voice call.

9. The method of claim 1, wherein the communication session comprises an instant messaging session.

10. The method of claim 1, wherein the communication session comprises a multimedia call.

11. A mobile device comprising:
    a processor;
    a near-field communication transceiver;
    a location unit coupled to the processor;
    a display device coupled to the processor; and
    a memory coupled to the processor, the memory including instructions executable by the processor to perform operations, the operations including:
    receiving, from an application server during a communication session with a first device, an option to receive a video identified by the first device;
    receiving an input indicating an acceptance of the option;
    in response to the input, automatically making a determination whether to have the video sent to a video output device that is distinct from the display device, to receive the video for display via the display device, or both, wherein the determination is based on a location from the location unit, wherein the making the determination comprises communicating via the near-field communication transceiver to nearby devices to determine whether the video output device is close to the location; and
    in response to the determination indicating to have the video sent to the video output device, sending a notification to the application server, wherein the notification identifies the video output device.

12. The mobile device of claim 11, wherein the communication session comprises a voice call, an instant messaging session, a multimedia call, or a combination thereof.

13. The mobile device of claim 11, wherein the operations further include:
    in response to the determination indicating to receive the video, sending a request for the video to the application server; and
    in response to the sending of the request, receiving the video from a media server.

14. The mobile device of claim 11, wherein the operations further include, in response to the video output device receiving the video, receiving a particular notice that the video is streaming to the video output device.

15. The mobile device of claim 11, wherein the location unit comprises a global positioning system, and wherein the processor is configured to determine whether the location is within a boundary for use of the video output device.

16. A computer-readable storage device including instructions that, when executed by a processor of a mobile device, cause the processor to perform operations, the operations comprising:
    receiving, from an application server during a communication session with a first device, an option to receive a video identified by the first device;
    receiving an input indicating an acceptance of the option;
    in response to the input, automatically making a determination whether to have the video sent to a video output device that is distinct from a display device of the mobile device, to receive the video for display via the display device, or both, wherein the determination is based on a location determined by a location unit, wherein the making the determination comprises communicating via a near-field communication transceiver to nearby devices to determine whether the video output device is close to the location; and
    in response to the determination indicating to have the video sent to the video output device, sending a notification to the application server, wherein the notification identifies the video output device.

17. The computer-readable storage device of claim 16, wherein the operations further comprise providing data to the application server, wherein the data indicates a format for the video.

18. The computer-readable storage device of claim 16, wherein the operations further comprise sending the video to the video output device in response to a wired or a wireless connection to the video output device.

19. The computer-readable storage device of claim 16, wherein the operations further comprise, in response to the video output device receiving the video, receiving a particular notice that the video is streaming to the video output device.

20. The computer-readable storage device of claim 16, wherein the communication session comprises a voice call.

\* \* \* \* \*